United States Patent [19]
Dettwiler

[11] Patent Number: 5,466,124
[45] Date of Patent: Nov. 14, 1995

[54] DEVICE FOR GENERATING AN INVERSION-KINEMATIC MOVEMENT

[76] Inventor: Hermann Dettwiler, Hauptstrasse 45, Ziefen, Switzerland, CH-4417

[21] Appl. No.: 117,960

[22] Filed: Sep. 8, 1993

[30] Foreign Application Priority Data

Mar. 5, 1993 [CH] Switzerland ............ 00651/93

[51] Int. Cl.$^6$ .............. B63H 1/30; F04D 11/00
[52] U.S. Cl. .............. 416/82; 416/65; 416/68; 416/83; 416/122; 416/141
[58] Field of Search .............. 416/65, 66, 68, 416/78–79, 82, 83, 98, 110, 120, 121–123, 141; 415/60; 366/64, 315, 316

[56] References Cited

U.S. PATENT DOCUMENTS

| | | |
|---|---|---|
| 137,359 | 4/1873 | Gerhard .............. 416/78 |
| 940,753 | 11/1909 | Tower . |
| 1,093,693 | 4/1914 | Glenn . |
| 1,729,676 | 10/1924 | Meindersma . |
| 1,903,551 | 4/1933 | Meindersma . |
| 3,215,371 | 11/1965 | Schmidt . |
| 3,508,840 | 4/1970 | Lederlin . |
| 3,605,506 | 9/1971 | Kuster et al. . |
| 4,753,574 | 6/1988 | Hess . |
| 4,880,353 | 11/1989 | Dettwiler . |

FOREIGN PATENT DOCUMENTS

| | | |
|---|---|---|
| 0209522 | 9/1989 | European Pat. Off. . |
| 0049680 | 9/1919 | France . |
| 1195068 | 11/1959 | France . |
| 589452 | 11/1933 | Germany . |
| 8201990 | 12/1983 | Netherlands . |
| 0216760 | 9/1941 | Switzerland . |
| 0361701 | 6/1962 | Switzerland . |
| 0366710 | 2/1963 | Switzerland . |
| 500000 | 12/1970 | Switzerland . |
| 0533275 | 3/1973 | Switzerland . |
| 0555490 | 10/1974 | Switzerland . |

OTHER PUBLICATIONS

"Rythumusforschung and Technik", Verlage Freies Geistesleben, 1975.

*Primary Examiner*—Edward K. Look
*Assistant Examiner*—Christopher Verdier
*Attorney, Agent, or Firm*—Selitto & Associates

[57] ABSTRACT

A device for converting a rotational movement for directing displacement of a flowable medium is provided with a mount and two rotatably mounted fixed axles which are arranged at a distance from one another on the mount and on which are articulated two end portions of a half cube-linkage chain having two lateral members and a middle member, the two lateral members being connected to the fixed axles and to the middle member by means of pivot axles which are successively offset relative to one another by in each case 90°. The device is characterized in that the middle member and at least one of the two lateral members of the half cube-linkage chain cooperate to form sheet-like driving elements for displacing flowable substances. At least one of a pair of adjacent driving elements possesses a free zone which is directed at a right angle to one of the pivot axles associated with the other of the pair of adjacent driving elements and into which the other of the pair of adjacent driving elements projects in a rotating manner for an unimpeded movement therein during an inversion-kinematic movement cycle, whereby the driving elements may be provided with uncomplicated shapes and may effectuate large-area substance displacements and a mutual stripping of flowable substances therefrom.

10 Claims, 5 Drawing Sheets

DEVICE FOR GENERATING AN INVERSION-KINEMATIC MOVEMENT

BACKGROUND OF THE INVENTION

1. Field of the Invention

The present invention relates to a device according to the pre-characterizing clause of the independent Patent Claim 1.

2. Description of the Prior Art

This invention is based on the inversion-kinematic movement characteristic, such as is described in detail in German Patent Specification 589,452 of Paul Schatz. The three-dimensional movement system described there is characterized in that it consists of individual intrinsically rigid members combined with one another by means of joints to form a movable annular composite structure which is positively reversible. As is known, such a movement system is based on the practical application of the cube linkage divisible into two halves. As shown in FIG. 1a, each of these cube-linkage halves consists of a mount member m and three pivotably interconnected members of the cube linkage, that is to say a middle member n and two limiting members o and p. The individual members o, n and p are connected to one another by means of pivot pins A, of which any two adjacent to one another are at right angles to one another. Two drive shafts x and y are mounted rotatably in the mount m.

Applications of this principle are, for example, the subject of EP 0 283 439 and EP 0 209 522. An oloid-like structure (see Swiss Patent Specification 500,000) fastened to the middle member of the half cube-linkage chain has two paddles rotated by 90° relative to one another. The two lateral members of the half cube-linkage chain have only a holding function here, that is to say they cannot be used as driving elements for the flowable medium and have a disturbing effect depending on the particular sector of use. In addition the supporting arms have to be dimensioned in a projecting and thus correspondingly massive manner, in order, on the one hand, to hold the linkage fixedly in terms of rotation and, on the other hand, to allow room for the deflections of the middle part which take up a large amount of space. Also, the production of the body shapes shown there, rotated on themselves, involves a very high outlay and an exact processing is extremely difficult and therefore correspondingly expensive. Depending on the particular sector of use, objects could also easily be trapped in the linkage and even inhibit running or damage the device.

SUMMARY OF THE INVENTION

The present invention overcomes the disadvantages and shortcomings of the prior art devices discussed above by providing a device for converting a rotational movement for directing displacement of a flowable medium, which at least partially surrounds the device. The device is provided with a mount and two rotatably mounted fixed axles which are arranged at a distance from one another on the mount and on which are articulated two end portions of a half cube-linkage chain having two lateral members and a middle member, the two lateral members being connected to the fixed axles and to the middle member by means of pivot axles which are successively offset relative to one another by in each case 90°. The device is characterized in that the middle member and at least one of the two lateral members of the half cube-linkage chain cooperate to form sheet-like driving elements for displacing flowable substances. The device is further characterized in that at least one of a pair of adjacent driving elements possesses a free zone which is directed at a right angle to one of the pivot axles associated with the other of the pair of adjacent driving elements and into which the other of the pair of adjacent driving elements projects in a rotating manner for an unimpeded movement therein during an inversion-kinematic movement cycle, whereby the driving elements may be provided with uncomplicated shapes and may effectuate large-area substance displacements and a mutual stripping of flowable substances therefrom.

The object of the present invention is to propose a device which is based on the principle of the reversible cube chain developed by Paul Schatz and which allows a relatively uncomplicated and therefore cost-effective production and, furthermore, is characterized by versatile use, whilst, among other things, an efficiency improved in relation to comparable known systems is achieved in ship's drives, in water sanitation, in material construction in loose earth and the turning over of material (snow, compost) and, last but not least, in use for substance mixing, where the known rotary mixers have, as is known, been incapable hitherto of preventing the feared adhesion of a mixture component to the agitator or to the vessel wall and it has been impossible to carry out the mounting of efficient strippers.

This object is achieved by means of the invention defined in the characterizing clause of the independent patent claim. By virtue of the inventive construction principle, the two lateral members of the half cube-linkage chain are now no longer mere supporting arms, but are also included in the main function of the device, since they can now themselves be made in the form of displacement and cleaning elements.

BRIEF DESCRIPTION OF THE DRAWINGS

Exemplary embodiments of the subject of the invention, together with an alternative version, are described below with reference to the accompanying drawing.

DESCRIPTION OF THE PREFERRED EMBODIMENTS

Figure 1:
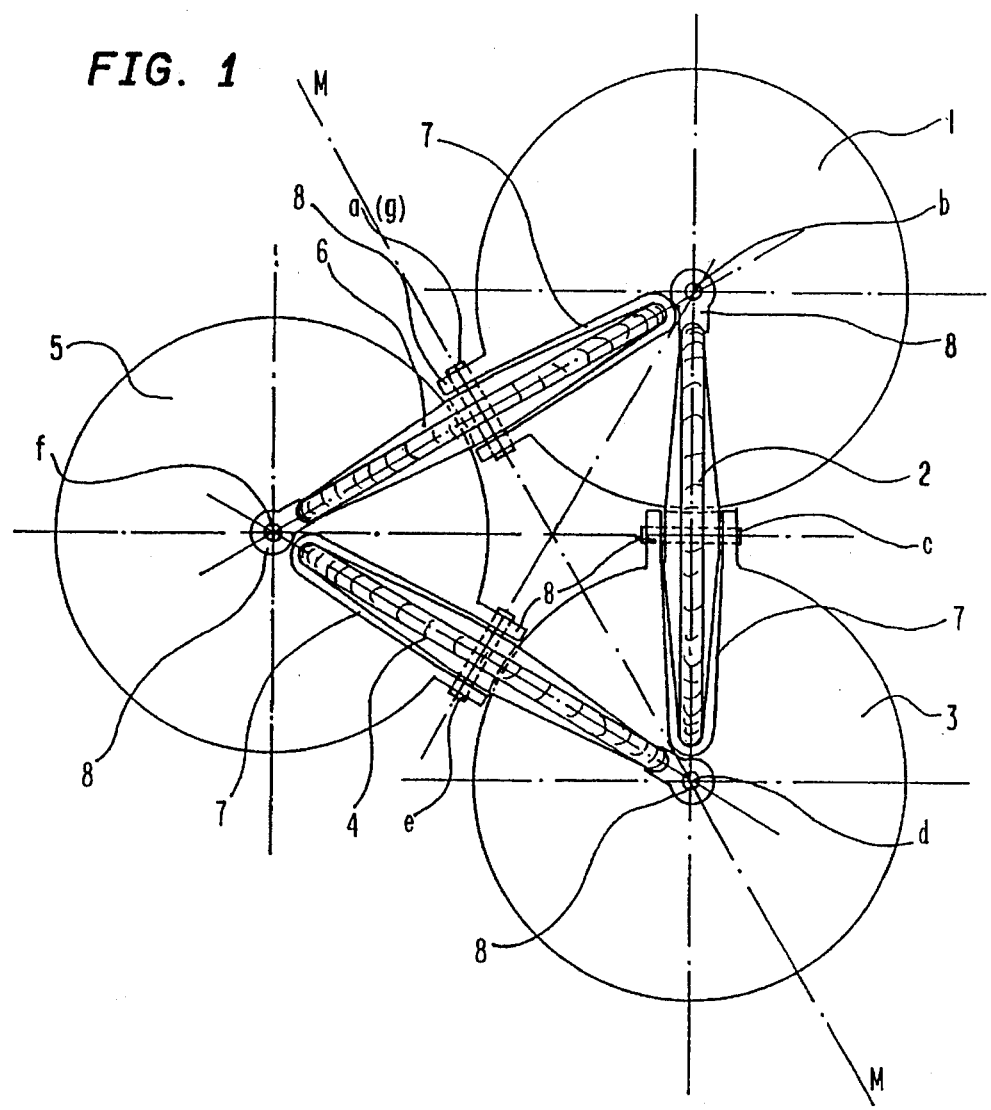
FIG. 1 is a top view of an embodiment provided with six driving elements.
Figure 1A:
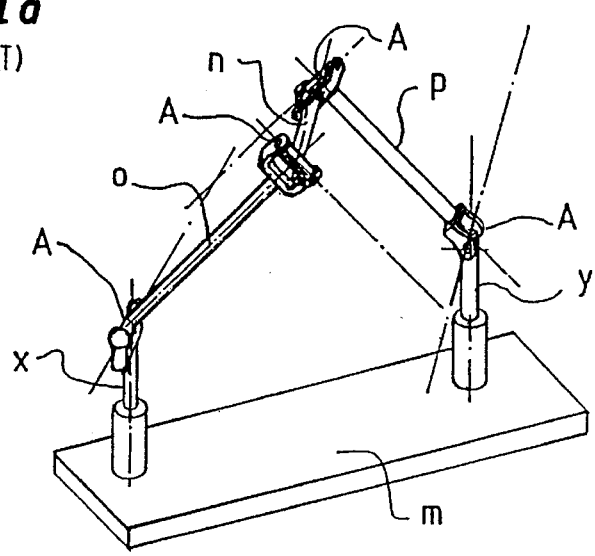
FIG. 1a shows the known half cube-linkage chain according to Paul Schatz which can be used for technical purposes.
Figure 3:
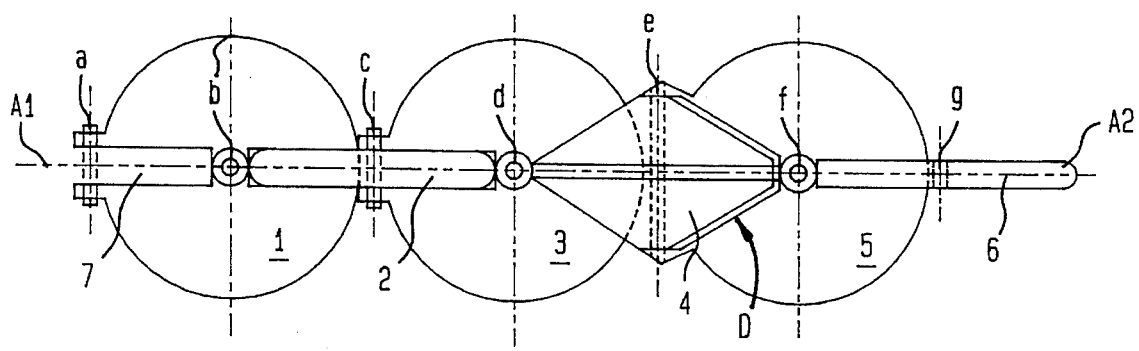
FIG. 3 illustrates an extreme position of the six-membered disc chain.

FIGS. 1 and 3 show six disc 1–6, preferably in the form of a circular disc, each with an axle b, c, d, e, f, a and with a radial cutout 7 which projects into the centre from the periphery and into which the adjacent disc projects, so that a respective disc can run round the periphery of the adjacent disc in the region of the said cutout 7. This movement system illustrated in FIG. 1 thus corresponds to the self-contained cube linkage according to Paul Schatz, the axis of symmetry which corresponds to the cube diagonal being designated by M-M and the linkage members designated by o, n and p in FIG. 1a being replaced by the disc 1 to 3 and 4 to 6.

Each of the disc 1 to 6 has a formed-on bearing fork 8 which serves for receiving one of the said axles a to f, on which the disc 1 to 6 are mounted rotatably. A rotating drive member can be coupled to the axle designated by a(g).

The six disc according to FIG. 1 can be assembled in such a way that, for example, a disc 6 is introduced into the radial cutout 7 of the adjacent disc 1 by means of a rotation of 90°, until the central bore of the disc 6 coincides with the axis of the bearing fork 8 of the disc 1, so that the axle a can be inserted. This operation is repeated until all the discs 1 to 6 engage in one another, as shown in FIG. 1. The structure thus formed can roll in or out towards the centre or away from it, so that the resulting movement corresponds exactly to that of the reversible cube linkage of Paul Schatz (German Patent Specification 589,452).

The cutouts 7 are slightly wider than the thickness of the adjacent disc projecting into them. In the example according to FIG. 1, the cutouts 7 extend, according to the diameter of the adjacent disc, almost over the entire disc radius into the vicinity of the disc axis. If the ring diameter is smaller, a shorter radial cutout 7 can also be selected, but the axis of the latter is always directed radially relative to the axis of the adjacent ring or is at right angles to this (see FIG. 1a).

Since each ring therefore rotates on both sides with virtually its entire surface in the cutout of the adjacent disc, each disc acts, in the region of the cutout, as a stripper or cleaning member for the adjacent disc, thus affording substantial time savings in many uses.

As a result of the use of the discs described, the largest possible three-dimensional structure can be moved inversion-kinematically with a minimum of large-area elements. The discs described can be varied in shape until they would touch one another and therefore inhibit rotation. It is possible, in principle, to have all possible shapes which, in the region between two adjacent axles, for example a and b in FIG. 3, possess a width extension remaining within a double cone D. If this geometrical limiting profile were exceeded, a continuous movement with a rotary drive would not be possible, but only a to-and-fro oscillatory pivoting movement.

The six-membered disc chain illustrated in FIG. 1 can be separated at any axle connection (a, b, c, d, e, f) and suspended or driven at the limiting point. On the structure according to FIG. 3, the separating point is located, for example, at the axle a or the associated axial bore g of the disc 6. This structure can be driven preferably at both ends (drive points $A_1$, $A_2$). Although a one-sided drive (for example, at $A_1$) is possible in principle, this can nevertheless not guarantee a coordinated deflection of the joints. The extreme position is evident from FIG. 3. It is also possible to use fewer than 6 discs, or discs can be replaced by other elements, for example forks, which make the connection from axle to axle.

Figure 2:
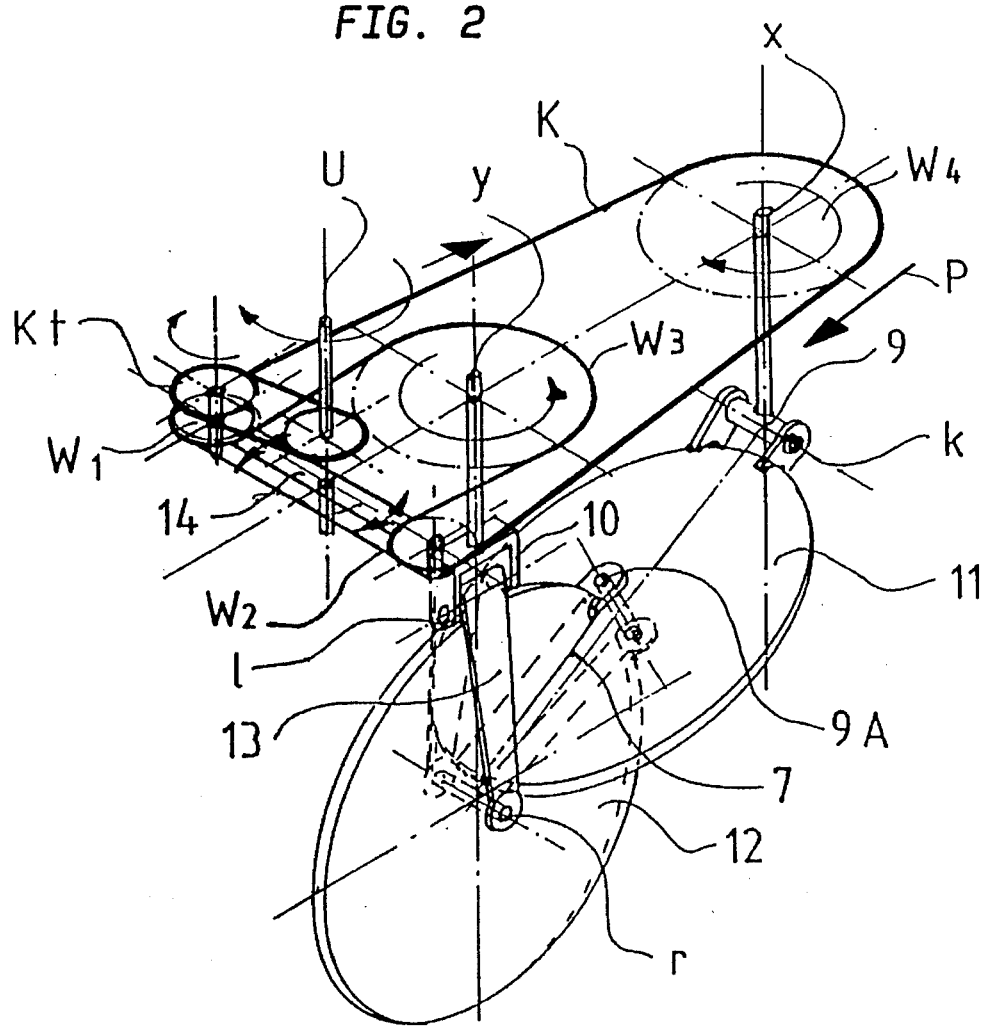
FIG. 2 shows a simple alternative version with only two driving elements.

FIG. 2 shows the reduction of the device to two discs. Two axles x and y mounted rotatably in a specific position on a mount (not shown) are provided on one side with bearing forks 9 and 10 for receiving axle pins k, 1. A disc 11, which in this case need not have a cutout, is suspended on the bearing fork 9. The second disc 12 is slipped with its radial cutout 7 over the disc 11 and is connected pivotably to the latter by means of the axle 9. By means of a fork 13 engaging on an axle pin r in the centre of the disc 12, the disc 12 is, for its part, suspended on the bearing fork 10, that is to say is coupled to the axle y by means of an axle pin 1 pivotably and, like all the other connections, positively in terms of torque.

Via a drive shaft U which is coupled to a motor (not shown), a suitable drive element K, for example an endless roller chain, is set in linear movement via a chain drive Kt. The drive element K is guided via four wheels W1, W2, W3 and W4, two wheels W3 and W4 being connected rigidly in terms of rotation to the drive shafts x and y. Thus, the wheels are set in rotation according to the directions of the arrows by means of the roller chain K. The cardanic deflections of the elements 11, 12 and 13, which correspond to the members o, n and p (FIG. 1a) of the half cube-linkage chain, give rise, on the drive shafts x and y, to an oppositely directed rotation at a non-constant rotational speed or circumferential speed, which would actually necessitate elliptical driving wheels. However, this requirement can be avoided if the two deflecting wheels W1 and W2 causing a reversal of direction of rotation are mounted on a pendulum arm 14 having the driving and floating axle U, with the result that the unequal driving-chain lengths are compensated by pendulum action.

In contrast to the paddle bodies which could be used hitherto within the reverse-kinematic system, the individual rings can be machined in many shapes, exactly as required, on a conventional rotary machine tool, such as a turning lathe, chasing lathe, etc.. Because of their uncomplicated sheet-like shape which, in principle, remains two-dimensional, a high accuracy can be maintained in a cost-effective way, thereby increasing the quality substantially and keeping the price within a reasonable range.

In the version according to FIG. 2, the fork 13 has to be produced only once, because the disc 11 is itself carried on the axle 9. Possible influences on flow therefore occur only on one side.

As shown in FIG. 1, further discs or else also other elements of the most diverse shapes can be suspended on this system, thereby allowing a wide variety of sectors of use.

The device illustrated in FIG. 2 can be employed particularly as a ship's drive. When the drive shafts y and x are rotated by means of a drive (not shown), the discs 11 and 12 move by rolling inversion-kinematically, so that an advancing movement takes place transversely to the drive shafts x and y (arrow P). When the drive shafts x and y rotate once, the front side and rear side of the discs 11 and 12 each rotate once through 180°. This brings about high thrust forces which are repelled in a paddle-like manner by the surrounding medium. The pronounced helical water movements occurring with ship's propellers and using up a large amount of force are absent in the principle described. Tests therefore show a surprisingly low energy outlay for a high power. Expedient shapes of the blades 11 and 12 can optimize the powers to a considerable extent. Furthermore, tests show the possibility of also introducing oxygen into the water at the same time by means of this drive for the purpose of water sanitation.

The water-displacement members (discs) used in the ship's drive can, by virtue of their uncomplicated shape, preferably be produced as hollow bodies, for example from stainless sheet steel, or, as required, be filled with a medium, for example oil, so that they float virtually weightlessly in water and their mounting is subjected to only relatively low reaction forces. Also, tests have confirmed that, as a result of the inversion-kinematic movement, the cavitation effect feared in conventional ship's propellers is avoided.

Figure 4:
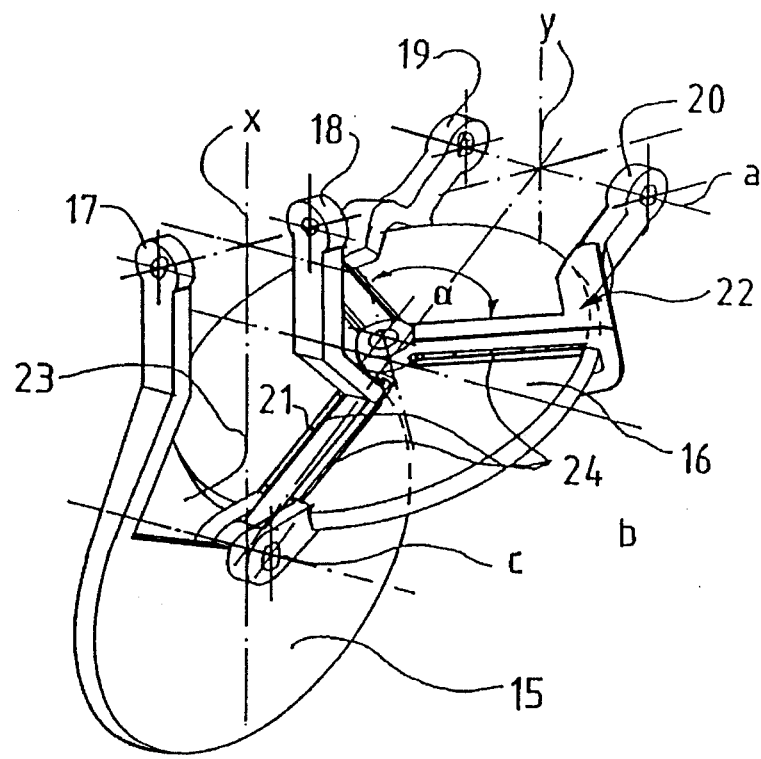
FIG. 4 shows an agitator member with strippers.

The construction illustrated in FIG. 4 is a mixing or agitating member which likewise has the property of cleaning itself continuously during running. Two virtually circular discs 15 and 16 are provided with four respective suspension lugs 17, 18, 19 and 20 which serve for receiving two pivot pins (not shown). The disc 16 has, once again, a radial cutout 21, into which the disc 15 projects, so that the two discs can move inversion-kinematically. The suspension lug 19 is shaped, together with the lug 20, to form a double fork 22, the two double legs of which virtually rest on the surfaces of the disc 16 and thus serve as strippers for the adhering mixing material. The two fork parts of the double fork 22 form an angle α of approximately 120° thus guaranteeing that the disc 16 is kept constantly clean over its entire surface by stripping.

The disc 15 has, underneath the suspension lugs 17 and 18, a cutout 23 which should correspond to the pivoting radius and the region of which is not encompassed by the disc 16. The double fork 22 is designed so that all the surfaces of the disc 15 are encompassed during the pivoting movement of the sysem. The stripping edges designated by 24 in FIG. 4 can be made in many different ways in terms of expedient material and design, for example as a continuous plastic lip or as an endless round rubber cord. With this construction, critical mixings and agitating operations can be carried out successfully in pasty or tacky media. In this respect, reference must also be made to the high mixing effect caused by the inversion-kinematic movement.

Figure 5:
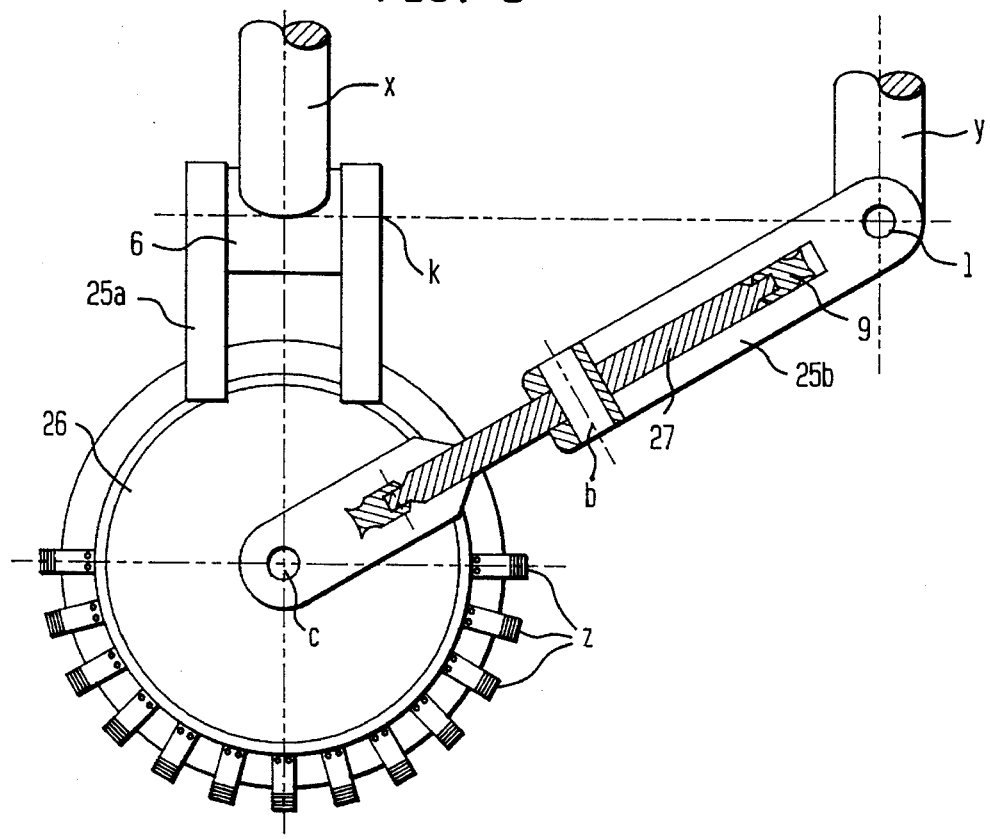
FIG. 5 is a representation of an appliance for working loose earth, etc.

FIG. 5 illustrates a further sector of use of the device for generating a inversion-kinematic movement. This relates to an appliance for removing or turning over loose earth, bulk material or particularly compost. Suspended on two drive shafts x and y are two forks 25a and 25b which are both mounted pendulously, each about an axis k and 1 (see also FIG. 2). The kinematic arrangement corresponds essentially to that of FIG. 2. The edge parts of the discs 26 and 27 are equipped with appropriately shaped tooth-like turning members Z which sufficiently withstand wear and which also reduce the surface of engagement, in order to save energy. Depending on whether the drive shafts x and y are arranged at the top, laterally or at a suitable angle, different movement characteristics in keeping with the object to be achieved can be obtained. In use as a rotary snow plough, the drive shafts are preferably arranged horizontally and the discs 26, 27 can be replaced by blades of flattened shape, so that the road can be cleared level.

In order to turn over a compost heap, the appliance should be driven vertically from above. The reverse movement brings about a perfect and intensive turning over, since the compost material is not only displaced, as in the known rotary systems, but is turned over crosswise. It can be advantageous, here, to use, instead of the disc-shaped discs, spherical hollow bodies which can be equipped partially or over their entire surface with tooth-like turning members Z.

Among the exemplary embodiments illustrated and described by means of the drawing, FIG. 1 shows a complete self-contained inversion-kinematic system having the entire cube linkage or two cube-linkage halves which are arranged mirror-symmetrically along the axis of symmetry M-M. In contrast, the systems according to FIGS. 2, 4 and 5 each show the use of one half cube linkage, but in all cases could be complemented mirror-symmetrically, without further action, by the other cube-linkage half.

Figure 6:
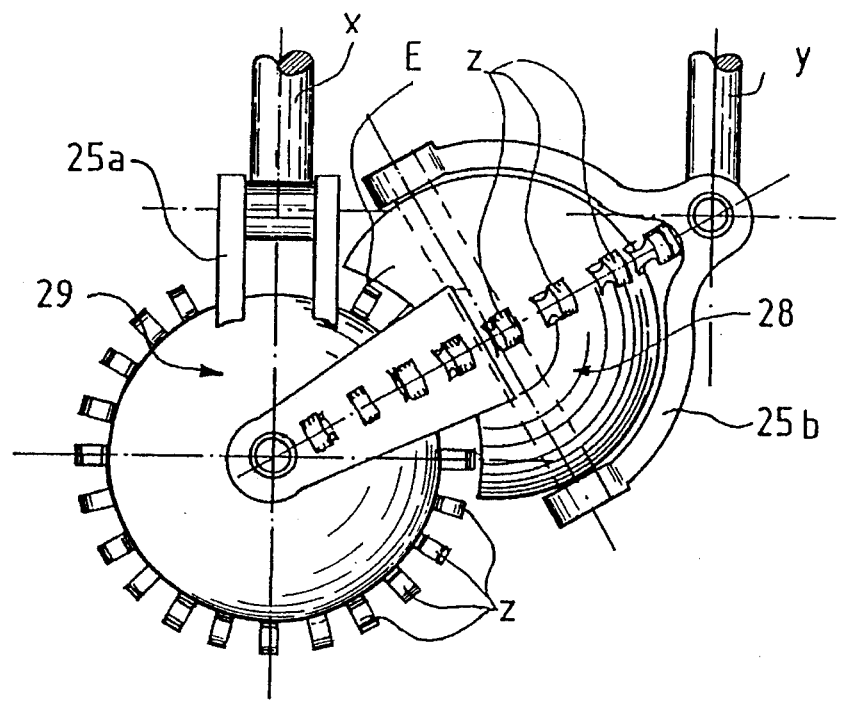
FIGS. 6, 7 and 8 show further embodiments.
Figure 7:
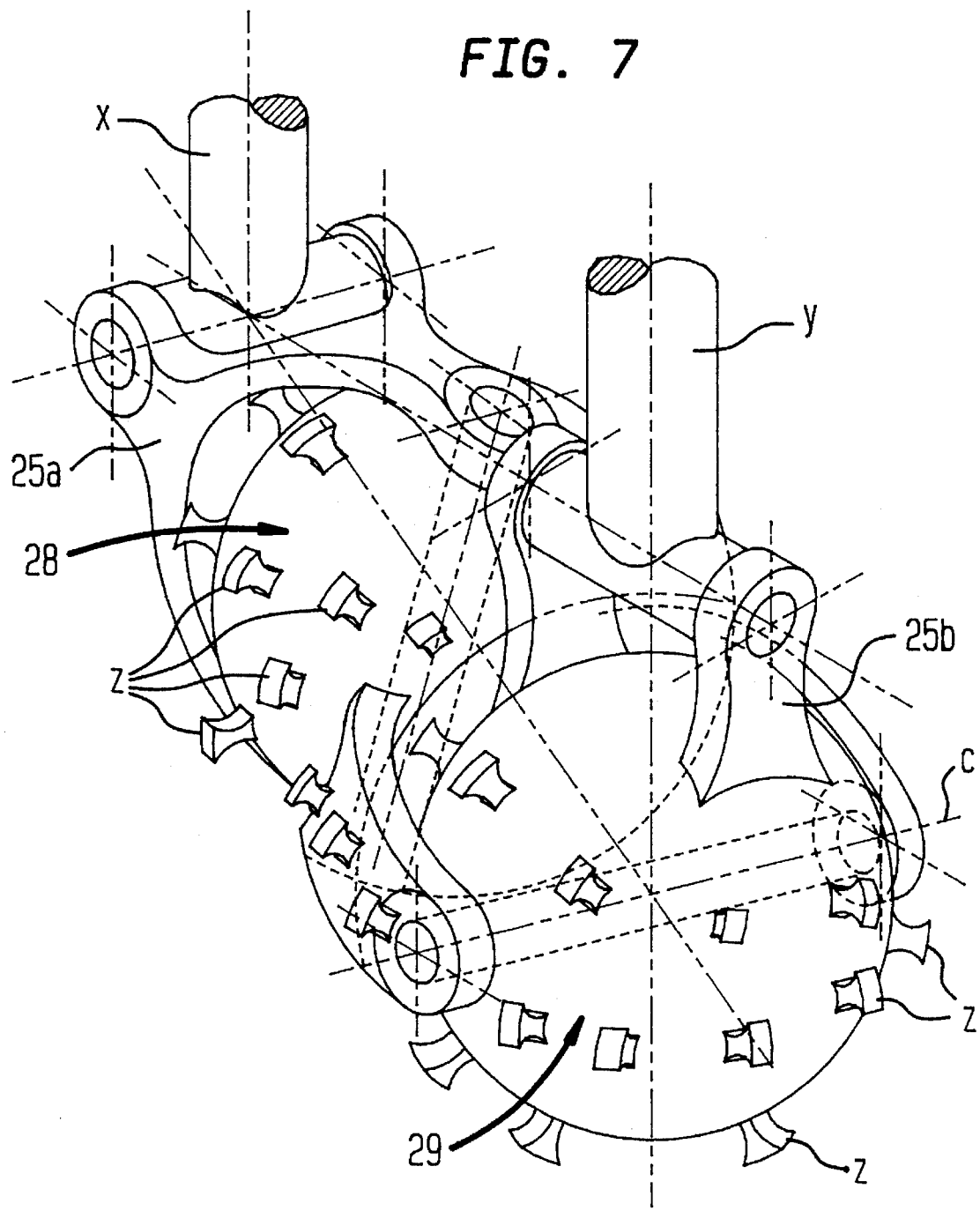

FIGS. 6 and 7 each show a device which proves advantageous for turning compost. The driving elements 28, 29 are made spherical here, whilst the tooth-like turning members Z either can be arranged in the form of a middle strip (FIG. 6) or (FIG. 7) can be distributed over virtually the entire sphere surface. As shown in FIG. 6, one sphere 28 is provided with an indentation E, so as not to impede the inversion-kinematic movement.

Figure 8:
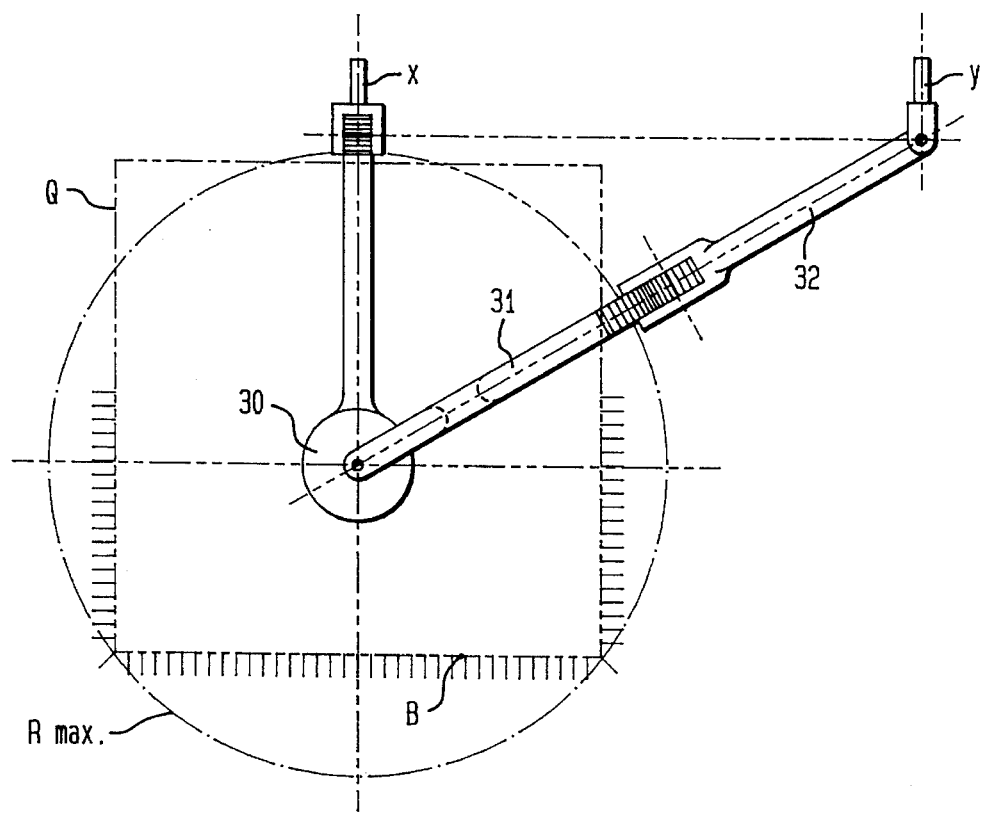

As already mentioned, the driving elements serving for displacing the medium can be varied in many ways within the limits predetermined by inversion kinematics. In the case of the principle shown in figures 4 to 7, a disc 30 of small diameter could, for example also be used, as shown in FIG. 8, and be connected to the drive fork 32 by means of a disc 31. The maximum possible size of a practicable disc 30 is represented by dot-and-dash lines and designated by $R_{max}$. The square contour shape Q which, provided with brushes B, can be used for cleaning special shapes can likewise be produced easily, and for an understanding of the resulting movement it must be remembered that the rotational drive movement acts on the profile Q only with a rotation of 240°.

The invention claimed is:

1. Device for converting a rotational movement for directing displacement of a flowable medium, which at least partially surrounds the device, with a mount (m) and with two rotatably mounted fixed axles (x, y) which are arranged at a distance from one another on the mount (m) and on which are articulated two end portions of a half cube-linkage chain having two lateral members (o, p) and a middle member (n), the two lateral members (o, p) being connected to the fixed axles (x, y) and to the middle member (n) by means of pivot axles (a to f) which are successively offset relative to one another by in each case 90°, characterized in that the middle member (n) and at least one of the two lateral members (o, p) of the half cube-linkage chain cooperate to form sheet-like driving elements for displacing flowable substances, and in that at least one of a pair of adjacent driving elements (1 to 6; 11, 12; 15, 16; 26, 27, 28, 29) possesses a free zone which is directed at a right angle to one of the pivot axles (a to g) associated with the other of the pair of adjacent driving elements and into which the other of the pair of adjacent driving elements projects in a rotating manner for an unimpeded movement therein during an inversion-kinematic movement cycle, whereby the driving elements are provided with uncomplicated shapes and effectuate large-area substance displacements and a mutual stripping of said flowable substances therefrom.

2. Device according to claim 1, characterized in that at least one of the pair of adjacent driving elements possesses a radial cutout (7) which extends from its periphery approximately as far as its central axis and the width of which corresponds at least to the thickness of the other of the adjacent driving elements projecting into the cutout.

3. Device according to claim 1, characterized in that the device has a pair of half cube-linkage chains which are oriented in a mirror-symmetrical arrangement.

4. Device according to claim 1 or 2, characterized in that the driving elements (1 to 6; 11, 12; 15, 16) are at least approximately in the form of a circular disc.

5. Device according to claim 1 for use in a solid pourable medium, for material removal in loose earth and for turning compost, characterized in that the driving elements (26, 27) have a toothing (Z) on part of their circumference.

6. Device according to claim 5, characterized in that the driving elements are made spherical and are provided at least partially with tooth-like turning members (Z) on their surfaces.

7. Device according to claim 1 with only two driving elements (11, 12), one (12) of which has a radial cutout (7), into which the other (11) projects, characterized in that there is connected to a drive shaft (U) an endless transmission member (K) which is guided via two wheels (W3, W4) coupled to the fixed axles (x, y) of the device whilst, furthermore, two deflecting wheels (W1, W2) causing a change in the direction of rotation of said wheels (W3, W4) are mounted on a floating axle (14) in such a way that the speed deviations of the two drive shafts (x, y) of the device, caused by the cardanic deflection of the device, are thereby compensated.

8. Device according to claim 1, characterized in that one of the driving elements (16) is provided with a cutout (21) and is suspended on a double fork (22) having a pair of double legs, the legs resting on surfaces of the one of the driving elements (16) and serving as strippers and forming an angle $\alpha$ of approximately 120° relative to one another.

9. Device according to claim 1 for use as a ship's drive, characterized in that the driving elements are designed as hollow bodies with a view to reducing their weight.

10. Device according to claim 1 for use as a cleaning appliance, characterized in that the driving elements are provided with peripheral brushes.

* * * * *